United States Patent
Dabral et al.

(10) Patent No.: US 6,777,975 B1
(45) Date of Patent: Aug. 17, 2004

(54) INPUT-OUTPUT BUS INTERFACE TO BRIDGE DIFFERENT PROCESS TECHNOLOGIES

(75) Inventors: Sanjay Dabral, Palo Alto, CA (US); Ming Zeng, San Jose, CA (US); Ramesh Senthinathan, Fremont, CA (US); Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/451,684

(22) Filed: Nov. 30, 1999

(51) Int. Cl.[7] ............................................. H03K 17/16
(52) U.S. Cl. ............................ 326/30; 326/68; 326/86
(58) Field of Search .......................... 326/30, 82, 83, 326/86, 68, 73, 74

(56) References Cited

U.S. PATENT DOCUMENTS

| | | | | |
|---|---|---|---|---|
| 4,620,310 A | * | 10/1986 | Lvovsky et al. | 375/17 |
| 5,045,730 A | * | 9/1991 | Cooperman et al. | 326/73 |
| 5,220,209 A | * | 6/1993 | Seymour | 307/443 |
| 5,365,127 A | * | 11/1994 | Manley | 326/73 |
| 5,457,407 A | * | 10/1995 | Shu et al. | 326/30 |
| 5,534,812 A | * | 7/1996 | Cao et al. | 327/333 |
| 5,568,062 A | * | 10/1996 | Kaplinsky | 326/27 |
| 5,602,494 A | * | 2/1997 | Sundstrom | 326/39 |
| 5,635,859 A | * | 6/1997 | Yokota et al. | 326/67 |
| 5,638,402 A | | 6/1997 | Osaka et al. | |
| 5,666,078 A | * | 9/1997 | Lamphier et al. | 327/108 |
| 6,026,456 A | * | 2/2000 | Ilkbahar | 710/101 |
| 6,118,350 A | * | 9/2000 | Gupta et al. | 333/22 R |
| 6,133,749 A | * | 10/2000 | Hansen et al. | 326/30 |
| 6,157,215 A | * | 12/2000 | Gabara et al. | 326/83 |
| 6,232,814 B1 | * | 5/2001 | Douglas, III | 327/281 |

FOREIGN PATENT DOCUMENTS

EP  0848 333 A2  6/1998

OTHER PUBLICATIONS

European Patent Office, Patent Abstracts of Japan, Publication No. 10150356, Publication Date Feb. 6, 1998, Inventor Got Mitsuhiko., 1 page.
EETimesonline, Semiconductor News, "Fairchild Touts GTLP for Telecom Busses", 1 pg., Feb. 17, 1999.

* cited by examiner

*Primary Examiner*—Daniel D. Chang
(74) *Attorney, Agent, or Firm*—Seth Z. Kalson

(57) ABSTRACT

A bus in which a transmission line is excited by a pMOSFET having a drain connected to the transmission line and having a source at a core voltage $V_{CC}$, and in which the transmission line is terminated by a device connected to ground.

12 Claims, 3 Drawing Sheets

INPUT-OUTPUT BUS INTERFACE TO BRIDGE DIFFERENT PROCESS TECHNOLOGIES

FIELD

The present invention relates to electronic systems, and more particularly, to a bus.

BACKGROUND

A GTL (Gunning Transceiver Logic) bus is well-known, where an example of an electronic system utilizing a GTL bus having nMOSFET (n-Metal Oxide Semiconductor Field Effect Transistor) driver 102 is illustrated in FIG. 1. In the example of FIG. 1, two agents are connected to transmission line 104 to receive signals from nMOSFET driver 102. An agent may be a microprocessor, memory device, or any other electronic device for sending or receiving signals along transmission line 104. Resistors $R_T$ are termination resistors to reduce reflections at the ends of transmission line 104, and are connected to a voltage source providing a termination voltage $V_{TT}$. Resistor $R_{ESD}$ is a resistor to reduce the probability of electrostatic discharge damage to nMOSFET driver 102, and may not be needed for some applications. The gate of nMOSFET driver 102 is driven according to a digital data signal so as to switch nMOSFET driver 102 ON and OFF to drive transmission line 104.

The ideal (quiescent or steady state) voltage of transmission line 104 is in the range $[V_{TT}-V_{SW}, V_{TT}]$, where the voltage swing $V_{SW}$ is given by $V_{SW}=V_{TT}[(R_T/2)/(R_{ONn}+R_{ESD}+R_T/2)]$ and where $R_{ONn}$ is the ON resistance of nMOSFET driver 102. Because of impedance mismatch due to mismatches between nMOSFET driver 102, termination resistor $R_T$, and transmission line 104, as well as stubs 106 and other artifacts, the actual signal voltage propagating along transmission line 104 will have over-shoots and under-shoots outside the ideal or quiescent voltage range. Note that in the above lumped-parameter equation for $V_{SW}$, the resistance $R_{ESD}$ adds to the resistance $R_{ONn}$. When $R_{ESD}$ is present, nMOSFET driver 102 needs to be designed with smaller $R_{ONn}$ than when $R_{ESD}$ is not present in order to maintain the same voltage swing on transmission line 104. However, reducing $R_{ONn}$ increases the size of nMOSFET driver 102, which increases the impedance mismatch.

In addition to distributing the core voltage $V_{CC}$ in an electronic system, GTL busses also require distributing the termination voltage $V_{TT}$, which may result in added system cost due to extra motherboard power planes, wiring, pins, etc. Furthermore, with new process technologies allowing for smaller core voltages than in the past, signal over-shoots above $V_{TT}$ may be too large for the oxide thickness of new process technologies. This problem may be alleviated by lowering the termination voltage, but then the voltage range $[V_{TT}-V_{SW}, V_{TT}]$ of transmission line 104 will be shifted, which may require a re-design of agents connected to the transmission line. Embodiments of the present invention address some or all of these problems.

SUMMARY

Embodiments of the present invention are directed to a bus in which a terminated transmission line is excited by a pMOSFET, where the transmission line is terminated by connecting at least one termination device between the transmission line and ground. In one embodiment, the pMOSFET has its drain connected to the transmission line and its source biased to a core voltage $V_{CC}$.

DETAILED DESCRIPTION OF EMBODIMENTS

Figure 2:
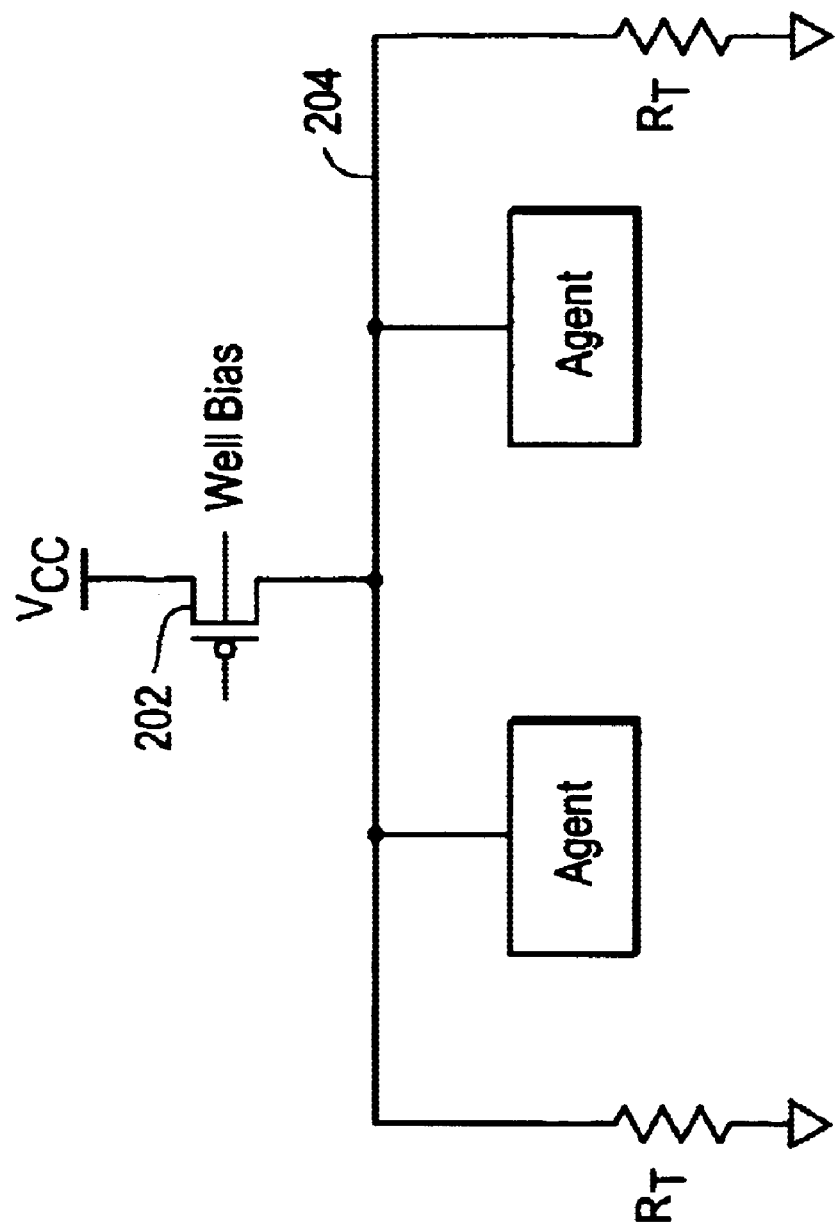
FIG. 2 illustrates an exemplary bus according to the present invention.

An embodiment of the present invention is illustrated in FIG. 2. In FIG. 2, pMOSFET driver (pullup) 202 drives transmission line 204 according to a data signal applied to its gate. The source of pMOSFET driver 202 is at a voltage $V_{CC}$. $V_{CC}$ may, but need not be, a processor core voltage. Resistors $R_T$ provide termination to transmission line 204 so as to reduce reflections and provide a pulldown to substrate voltage $V_{SS}$. The substrate voltage $V_{SS}$ may also be termed a ground voltage, and the terms ground and substrate may be used interchangeably.

In practice, pMOSFET driver 202 may actually comprise a plurality of pMOSFETs coupled in parallel, where some subset of the plurality of pMOSFETs have their gates enabled to be responsive to the data signal. In this way, the effective ON resistance of pMOSFET driver 202 may be adjusted by proper choice of the enabled subset. It is therefore to be understood in this specification and the following claims that a pMOSFET driver may also include a plurality of parallel coupled pMOSFETs in which all or some proper subset of the plurality are enabled.

By terminating transmission line 204 to $V_{SS}$, a separate voltage source for $V_{TT}$ is not needed as in some prior art busses. Furthermore, the ideal voltage range of transmission line 204 is $[V_{SS}, V_{SS}+V_{SW}]$, where the swing voltage $V_{SW}$ is given by $V_{SW}=V_{CC}[(R_T/2)/(R_{ONp}+R_T/2)]$ and where $R_{ONp}$ is the ON resistance of pMOSFET driver 202. The ideal voltage range is referenced to $V_{SS}$, and thus embodiments of the present invention may be better suited to bridging different process technologies than prior art busses.

Figure 1:
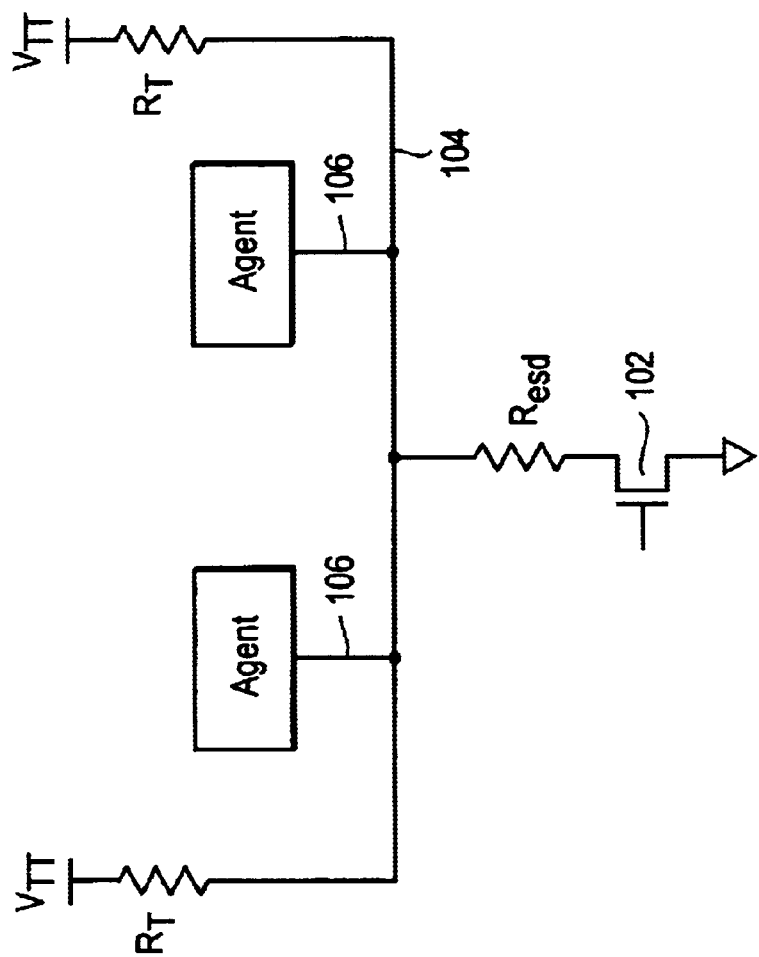
FIG. 1 illustrates a prior art GTL bus.

For many practical situations, the embodiment of FIG. 2 exhibits some other advantages over the embodiment of FIG. 1. For example, when the voltage swings of the embodiments of FIGS. 1 and 2 are equal, it is found that the driver of the present embodiment may be better matched to the transmission line characteristic impedance. As a specific example, consider the case in which a 60Ω transmission line is terminated at both ends with 60Ω resistors, and where the voltage swing is 1.0V. For an embodiment of the present invention according to FIG. 2, the output impedance of pMOSFET 202 is 15Ω if $V_{CC}$=1.5V. However, for the example of prior art FIG. 1, the sum of the output impedance of nMOSFET 102 with resistor $R_{ESD}$ is 15Ω if $V_{TT}$=1.5V. Since $R_{ESD}$>0, the output impedance of nMOSFET 102 is less than 15Ω, and thus there is greater mismatch than in the embodiment of FIG. 2.

Another advantage of some of the embodiments is that to maintain the same voltage swing, pMOSFET 202 may be similar or smaller in size than nMOSFET 102 without sacrificing driver strength. Also, because pMOSFETs are less susceptible to electrostatic discharge damage, for many applications an electrostatic discharge resistor is not needed for pMOSFET driver 202. This allows greater flexibility in its manufacturing process. Furthermore, the use of pMOSFETs with an n-well process may be advantageous in that substrate noise may be reduced, which may be particularly advantageous for so-called systems-on-chip designs.

The embodiment of FIG. 2 may be modified in various ways. For example, termination resistors $R_T$ may be replaced with on-chip nMOSFETs. Note that adding electrostatic discharge resistors $R_{ESD}$ to such nMOSFETs not only provide the function of reducing the probability of electrostatic discharge, but they also linearize the effective resistance termination of the nMOSFETs in combination with the resistors $R_{ESD}$ so as to provide better termination of the transmission line.

Figure 3:
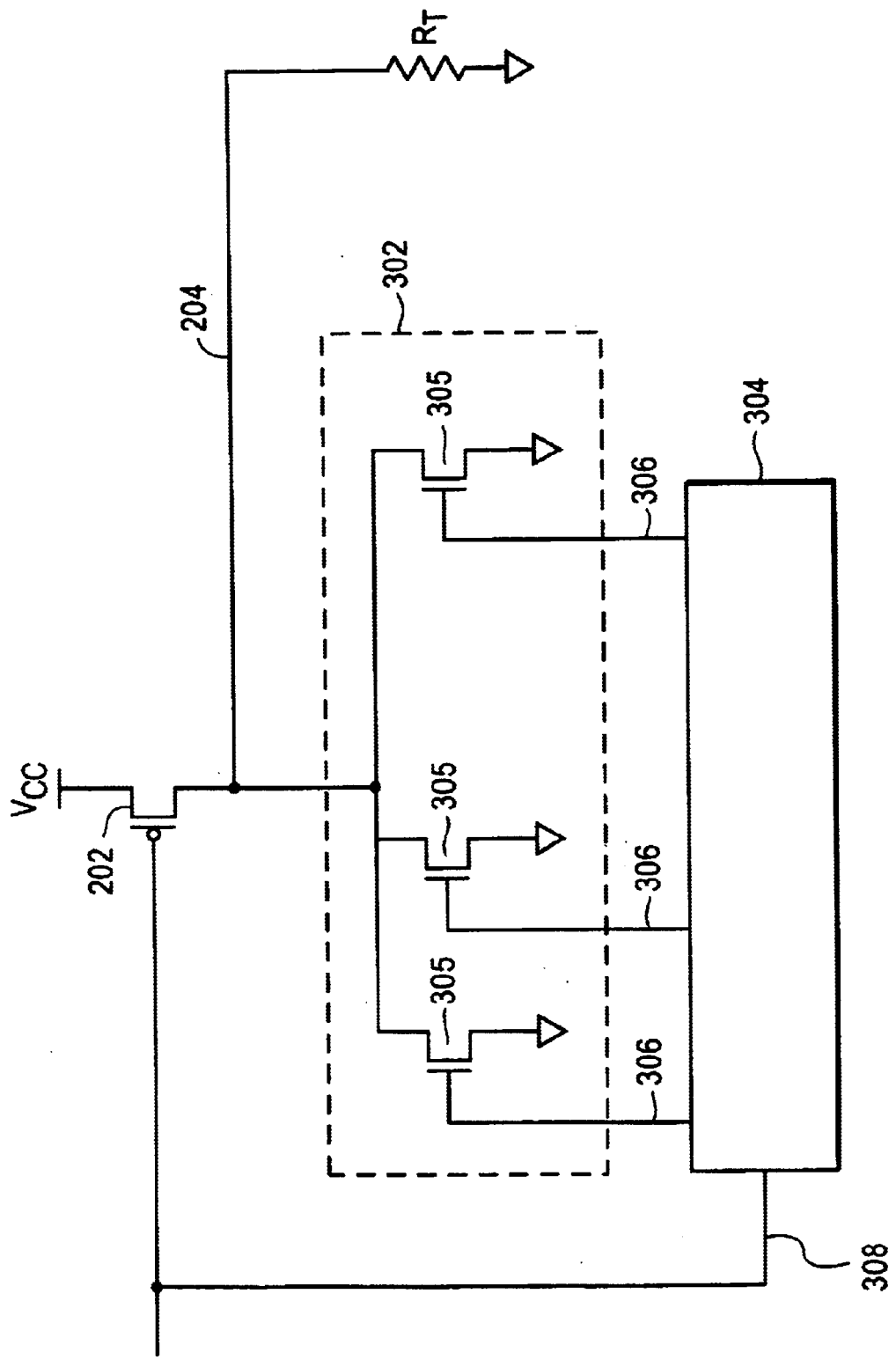
FIG. 3 illustrates another exemplary bus according to the present invention.

Another embodiment of the present invention is provided in FIG. 3, which is applicable to high speed, point-to-point busses in which it is particularly advantageous for a driver's impedance to be matched to a transmission line. However, it is not necessary for the driver's impedance to be matched to the transmission line. In FIG. 3, in addition to pMOSFET driver 202 and transmission line 204, is nMOSFET driver 302 and combinational logic circuit 304. nMOSFET driver 302 is shown as comprising a plurality of nMOSFETs 305 having gates connected to output ports 306 of combinational logic circuit 304. The input port 308 of combinational logic circuit 304 is responsive to the same digital data signal that drives the gate of pMOSFET driver 202. It is to be understood in this specification and the following claims that a nMOSFET driver may also include a plurality of parallel coupled nMOSFETs in which all or some proper subset of the plurality are enabled.

The input-output relationship of combinational logic circuit 304 is such that when input port 308 is LOW, a subset of nMOFETs 305 is switched ON so that the parallel combination of the ON resistance of nMOSFET driver 302 with the ON resistance of pMOSFET driver 202 is substantially matched to the characteristic impedance of transmission line 204; whereas when input port 308 is HIGH, the effective ON resistance of nMOSFET driver 302 is substantially matched to the characteristic impedance of transmission line 204. In this way, the impedance of the combination of pMOSFET driver 202 and nMOSFET driver 302 is matched to transmission line 204.

The embodiment of FIG. 3 may also be used in a differential signaling scheme, where in addition to the circuit of FIG. 3 another circuit identical to that of FIG. 3 is also employed but in which it is driven by a data signal complementary to the data signal that drives the circuit of FIG. 3.

Various modifications may be made to the disclosed embodiments without departing from the scope of the invention as claimed below.

What is claimed is:

1. An electronic system comprising:
    a ground having a ground voltage;
    a transmission line having a first end with a first characteristic impedance, a second end with a second characteristic impedance, and a quiescent voltage at ground voltage;
    a first termination device connected to the first end of the transmission line and connected to ground to provide an impedance substantially matched to the first characteristic impedance of the transmission line;
    a second termination device connected to the second end of the transmission line and connected to ground; and
    a first agent connected to the transmission line, the first agent comprising a die having a first core voltage, the die comprising a pMOSFET comprising a source at the first core voltage and a drain connected to the transmission line.

2. The electronic system as set forth in claim 1, further comprising:
    a second agent connected to the transmission line, the second agent comprising a die having a second core voltage, the die of the second agent comprising a pMOSFET comprising a source at the second core voltage and a drain connected to the transmission line.

3. The electronic system as set forth in claim 2, wherein the first core voltage is not equal to the second core voltage.

4. The electronic system as set forth in claim 3, wherein the first agent is connected at the first end of the transmission line, and wherein the first termination device is integrated on the die of the first agent.

5. The electronic system as set forth in claim 4, wherein the second agent is connected to the transmission line at neither the first nor second end of the transmission line.

6. The electronic system as set forth in claim 2, wherein the first agent is connected at the first end of the transmission line, and wherein the first termination device is integrated on the die of the first agent.

7. The electronic system as set forth in claim 6, wherein the second agent is connected to the transmission line at neither the first nor second end of the transmission line.

8. The electronic system as set forth in claim 1, wherein the first agent is connected at the first end of the transmission line, and wherein the first termination device is integrated on the die of the first agent.

9. The electronic system as set forth in claim 1, wherein the first agent is connected to the transmission line at neither the first nor second end.

10. An electronic system comprising:
    a ground having a ground voltage;
    a transmission line having a first termination device connected to ground to reduce signal reflections such that the transmission line has a quiescent voltage at ground voltage;
    a die having a core voltage and comprising:
        a pMOSFET driver to drive the transmission line, the pMOSFET driver having a source biased to the core voltage and a drain connected to the transmission line; and
        a second termination device coupled to the transmission line.

11. The electronic system as set forth in claim 10, wherein the second termination device comprises:
    a nMOSFET driver coupled to the transmission line, the nMOSFET driver having a source at the ground voltage; and
    a combinational logic circuit coupled to the nMOSFET driver; and
    wherein the combinational logic circuit is coupled to the nMOSFET driver so that the nMOSFET driver has a first ON resistance when the pMOSFET driver is ON and a second ON resistance when the pMOSFET driver is OFF, wherein the first and second ON resistances are not equal to each other.

12. The electronic system as set forth in claim 10, wherein the second termination device comprises:
    a nMOSFET driver coupled to the transmission line, the nMOSFET driver having a source at the ground voltage; and
    a combinational logic circuit coupled to the nMOSFET driver; and
    wherein the transmission line has a characteristic impedance, wherein the pMOSFET driver and nMOSFET in combination have an impedance substantially matched to the characteristic impedance of the transmission line if both the pMOSFET driver and nMOSFET driver are switched ON, and wherein the nMOSFET has an impedance substantially matched to the characteristic impedance of the transmission line if the pMOSFET driver is switched OFF.

* * * * *